Figure 1:
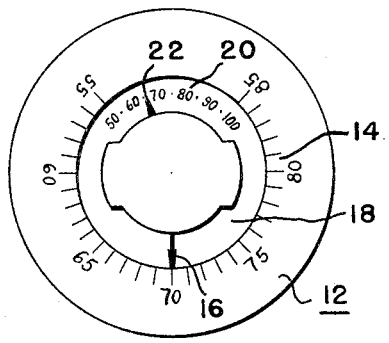

Aug. 28, 1962    D. W. LAVIANA ETAL    3,051,001
ROOM THERMOSTAT

Filed March 19, 1958    2 Sheets-Sheet 1

INVENTORS
Donald W. Laviana
BY Theodore Fedkew

M. H. Strickland
Their Attorney

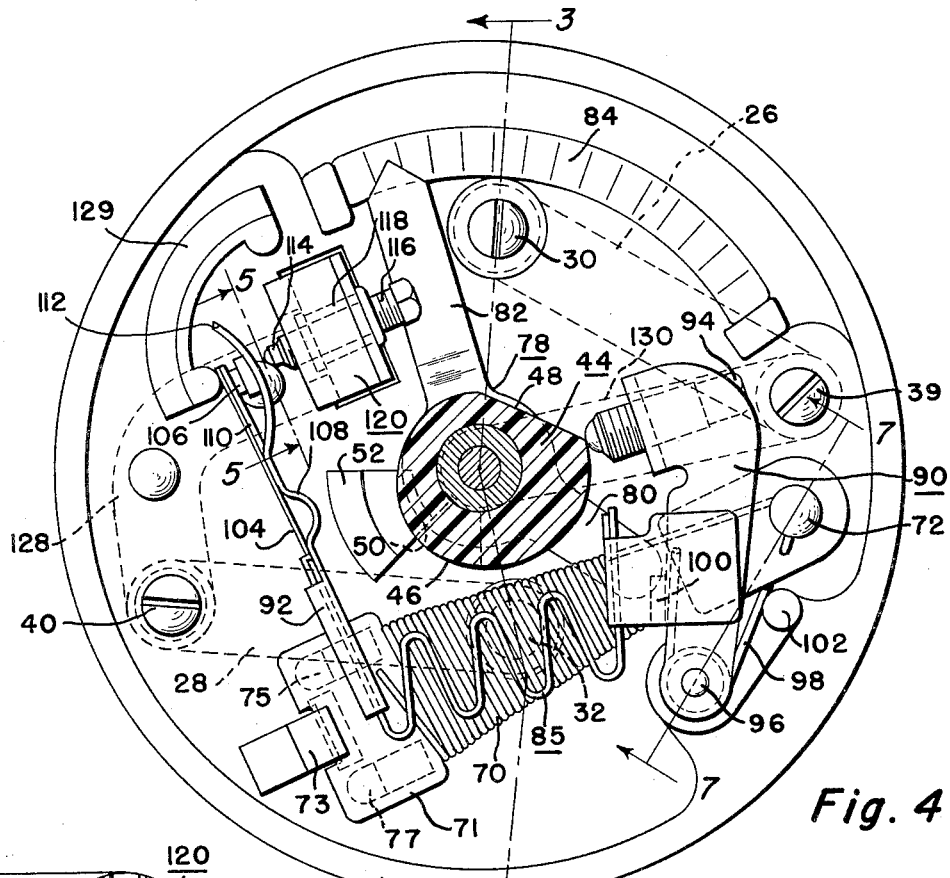
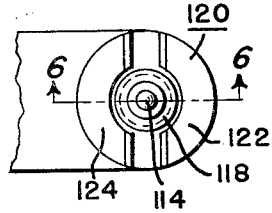
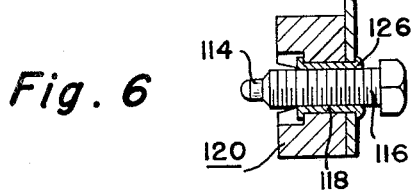
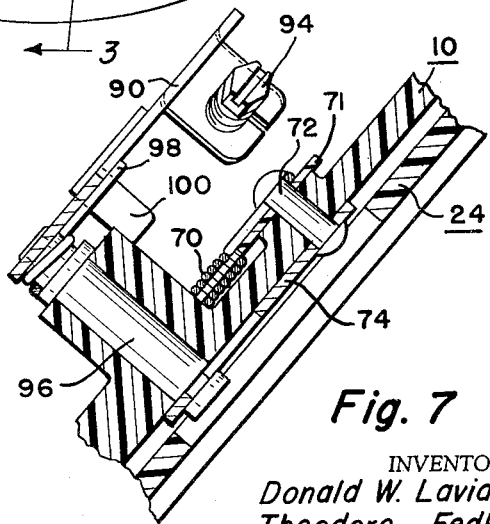
Fig. 4
Fig. 5
Fig. 6
Fig. 7
INVENTOR.
Donald W. Laviana
BY Theodore Fedkew
G. H. Strickland
Their Attorney

United States Patent Office 3,051,001
Patented Aug. 28, 1962

3,051,001
ROOM THERMOSTAT
Donald W. Laviana, Pittsford, and Theodore Fedkew, Rochester, N.Y., assignors to General Motors Corporation, Detroit, Mich., a corporation of Delaware
Filed Mar. 19, 1958, Ser. No. 722,440
6 Claims. (Cl. 73—363.7)

This invention pertains to thermostats, and particularly to round room thermostats having bimetallic temperature responsive means.

Heretofore temperature responsive means have been embodied in round housings so as to improve their appearance. However, the construction of previous round room thermostats has been complex and expensive to manufacture. The present invention relates to an inexpensive round room thermostat including independent temperature setting and temperature indicating scales, readily accessible temperature setting means and an adjustable anticipator resistor. Accordingly, among our objects are the provision of a compact round room thermostat; the further provision of a round room thermostat including independent temperature indicating and temperature setting scales; and the still further provision of a round room thermostat which can be readily assembled and disassembled.

The aforementioned and other objects are accomplished in the present invention by incorporating temperature setting indicia on a rotatable cover which conceals the temperature responsive switch means and includes a crystal through which the temperature indicating scale is visible. Specifically, the round room thermostat includes three assemblies, namely a sub-base, a base and a cover. The sub-base comprises a circular plate of insulating material having a pair of terminal strips thereon and a pair of mounting holes by which it can be attached to a wall. The circular base of insulating material has cylindrical recesses on opposite sides of an intermediate web. The sub-base is disposed within one of the cylindrical recesses and is attached to the base by a pair of screws. The base has attached thereto a fixed stub shaft about which a temperature setting cam is rotatably journalled. A circular scale plate, a bimetallic thermometer and a cover plate are also attached to the fixed stub shaft.

A tapered anticipator resistor is rigidly attached to the base and electrically connected to one end of a corrugated bimetal element. The bimetal element is pivotally mounted on the base in spaced relation to the anticipator resistor and is connected to a follower spring biased into engagement with the cam. The other end of the bimetal element is attached to a movable contact and armature assembly. A permanent magnet carried fixed contact is attached to the base. An adjustable slider for the anticipator resistor is rotatably journalled on the base, one end of which is engageable with the anticipator resistor and the other end of which cooperates with a scale secured to the base.

The cover comprises an annulus of insulating material having a convex transparent crystal at its center through which the temperature indicating scale is visible. The cover has indicia thereon and is attached to the cam for setting the control point of the thermostatic switch. The temperature setting of the thermostat is indicated by an index on the thermometer scale plate which cooperates with the indicia on the cover.

Further objects and advantages of the present invention will be apparent from the following description, reference being had to the accompanying drawings, wherein a preferred embodiment of the present invention is clearly shown.

Figure 2:
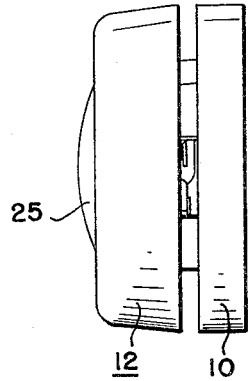
Figure 3:
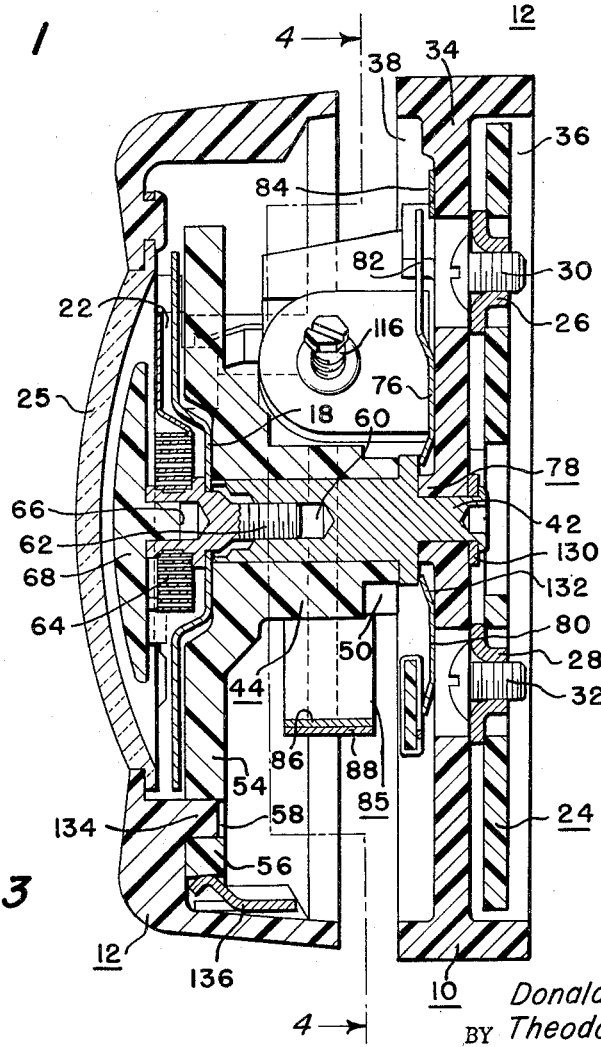

In the drawings:
FIGURE 1 is a front view of a thermostat constructed according to this invention.
FIGURE 2 is a side view of a thermostat constructed according to this invention.
FIGURE 3 is an enlarged sectional view taken along line 3—3 of FIGURE 4.
FIGURE 4 is a view, partly in section and partly in elevation, taken along line 4—4 of FIGURE 3.
FIGURE 5 is a fragmentary view in elevation taken along line 5—5 of FIGURE 4 with the cam in the maximum temperature setting position.
FIGURE 6 is a fragmentary sectional view taken along line 6—6 of FIGURE 5.
FIGURE 7 is an enlarged fragmentary sectional view taken along line 7—7 of FIGURE 4.

With particular reference to FIGURES 1 and 2, the thermostat comprises a circular base 10 of insulating material and a circular cover 12 of insulating material mounted in spaced relation to the base so as to permit the circulation of air between the cover and the base directly adjacent the temperature responsive means which are carried by the base. As seen in FIGURE 1, the cover 12 has arcuately arranged indicia 14 for indicating the temperature setting of the thermostat. An index 16 on a stationary scale plate 18 cooperates with the indicia 14 to indicate the temperature setting. The scale plate 18 also has arcuately arranged temperature indicia 20 for indicating ambient temperature. A pointer 22 of a spiral bimetallic thermometer cooperates with the temperature indicia 20. The scale 18 is visible through a generally convex crystal 25 secured in a central opening in the cover 12.

With particular reference to FIGURES 3 and 4, the thermostat includes a sub-base 24 comprising a circular plate of dielectric material having a pair of terminal strips 26 and 28 attached thereto, and a pair of mounting holes, not shown, for attaching the sub-base 24 to a wall. The electrical connections from the furnace to the thermostat are made by wires, not shown, which are electrically connected to the terminal strips 26 and 28 by screws 30 and 32, respectively.

As seen in FIGURE 3, the base 10 has an intermediate web 34 and a pair of cylindrical recesses 36 and 38 on opposite sides of the web. The sub-base 24 is disposed within the cylindrical recess 36 and is attached to the base 10 by a pair of screws 39 and 40, as seen in FIGURE 4. The screws 39 and 40 engage threaded openings in the terminal strips 26 and 28.

The base 10 has a fixed stub shaft 42 rigidly attached thereto about which a cam member 44 of suitable insulating material is rotatably journalled. As seen in FIGURE 4, the cam member 44 has a spiral surface 46 and a flat surface 48, and is formed with an integral lug 50 which coacts with a lug 52 on the base to positively limit angular movement of the cam 44 to a predetermined angle, for example 270°. The cam 44 is formed with a radially extending flange portion 54 having three ears, or projections, only one of which 56 is shown in the drawings. Each projection has an aperture 58, the purpose of which will be described hereinafter.

The fixed stub shaft 42 is counterbored as indicated by numeral 60, counterbore 60 being threaded to receive a thermometer shaft 62. The scale plate 18 is clamped between the thermometer shaft 62 and the stub shaft 42, and thus is restrained against rotation at all times. The inner end of a spiral bimetallic thermometer 64 is attached to the shaft 62, and the other end carries the pointer 22 which cooperates with the temperature indicia 20 on the scale plate 18. The thermometer shaft 62 is likewise counterbored, as indicated by numeral 66 and receives a bezel, or cover plate, 68 for concealing the bimetal thermometer 64.

With particular reference to FIGURE 4, a tapered wire wound anticipator resistor 70 carried by an insulating member 71 is fixedly attached to the base 10 within the cylindrical recess 38. The right hand end of the wire wound resistor 70, as shown in FIGURES 4 and 7, is electrically connected by a rivet 72 to a terminal strip 74 disposed on the under side of the web 34. The left hand end of the member 71 is interlocked with projections 73, 75 and 77 on the base 10. A slider 76 is rotatably journalled on a hub boss 78 of the base 10, one end 80 of the slider engaging the resistor 70, and the other end 82 constituting a pointer which cooperates with a scale 84 secured to the base 10. The scale 84 is calibrated in any suitable manner to indicate the current value of the resistor 70 connected in series with the bimetallic switch.

A corrugated bimetallic element 85 having a high expansion side 86 and a low expansion side 88 has one end attached to an arm assembly 90 and the other end attached to an armature and contact assembly 92. The arm assembly 90 includes an adjustable cam follower screw 94 engageable with the cam 44, and is pivotally connected to the base 10 by a pin 96. The arm assembly 90 is biased in the counterclockwise direction as viewed in FIGURE 4 by a torsion spring 98, one end of which engages a lug 100 on the arm and the other end of which engages a boss 102 on the base, the intermediate portion of the torsion spring 98 encircles the pin 96. The pin 96 also constitutes the electrical connection from the anticipator resistor 70 to the bimetal element 85 since the pin 96 is electrically connected to the arm 90 and is also electrically connected through terminal strip 74 and rivet 72 to the right hand end of the anticipator resistor 70. The armature and contact assembly 92 includes a leaf spring 104 carrying a contact 106 and an armature 108 of magnetic material having a flat portion 110 and a yoke type curved portion 112 having a pair of spaced interconnected ears, or legs, between which the contact 106 is disposed. A stationary contact 114 is formed on the end of an adjustable screw 116 which is threaded into a bushing 118 carried by a small permanent magnet 120 attached to the base 10.

As seen in FIGURES 5 and 6, the permanent magnet 120 has a pair of pole faces 122 and 124 between which the contact 114 is disposed. The bushing 118 is disposed in a central hole in the permanent magnet, and the outer end of the bushing is deformed as indicated by numeral 126 to clamp a metallic supporting bracket 128 to the magnet. The spaced legs of the armature 112 are engageable with the faces 122 and 124 of the magnet 120, and the magnet is utilized to impart snap action opening and closing movement to contacts 106 and 114 in a manner similar to that disclosed in the Hardy et al. Patent #2,263,988. The base 10 is formed with an integral arcuate shield and stop 129 which limits counterclockwise movement to the armature and contact assembly 92 and shields the contacts 106 and 114.

The major portion of bracket 128 is disposed on the under side of the web 34 and is electrically connected to the terminal strip 28 by the screw 40. The fixed stub shaft 42 is electrically connected to a terminal strip 130 which is electrically connected by the screw 39 to the terminal strip 26. In addition, the slider 76 is formed with spring fingers 132, as seen in FIGURE 3, so that the slider is electrically connected to a shaft 42, and hence to the terminal strip 130 and the terminal strip 26. Accordingly, when the contacts 106 and 114 are in engagement, that portion of the anticipator resistor 70 between the end 80 of the slider and the rivet 72 will be connected in series with the bimetallic element 84 and the switch contacts 106 and 114. The energizing circuit includes terminal strip 26, screw 39, terminal strip 130, shaft 42, finger 132 of the slider 76, the end 80 of the slider, the part of the wire wound resistor 70 between the end 80 of the slider and the rivet 72, the terminal strip 74, the pin 96, the arm assembly 90, the bimetallic element 85, the leaf spring 104, the contact 106, the contact 114, the terminal strip 28, the screw 40, and the terminal strip 28.

It can be seen that the anticipator resistor 70 is located adjacent the bimetallic element 85 so that the heat produced upon energization of the resistor 70 will effect the bimetallic element. The cover 12 is formed with three integral bosses 134 which are received in the apertures 58 of the ears 56 of the cam 44. In addition, the cover carries three spring clips 136 which engage the end of the ears 56 to detachably interconnect the cover and the cam 44. Preferably, one of the holes 58 in the ears 56 is of a different configuration than the aperture in the other hole so as to properly index the cover 12 with respect to the cam 44.

The temperature setting, or control point, of the thermostat can be readily adjusted by rotating the cover 12 and the cam 44 relative to the base, and the index 16 on the scale plate 18 will indicate the temperature setting of the bimetallic element. As the cover 12 and the cam 44 are rotated, the cam follower screw 94 will effect pivotal movement of the arm assembly 90 thereby varying the stress of the bimetallic element 85. As viewed in FIGURE 1, when the cover 12 is rotated in the clockwise direction, the temperature setting of the thermostat is increased since the arm assembly 90 is moved in the clockwise direction about pin 96. The arm assembly 90 and the cam 46 are shown in the maximum temperature setting position, namely 85° F., in FIGURE 4. As the cover 12 is rotated in the counterclockwise direction as viewed in FIGURE 4, the arm assembly 90 will rotate in the counterclockwise direction about pivot pin 96, as viewed in FIGURE 4, thereby resulting in a lower temperature setting of the thermostat. Moreover, if it should become necessary to vary the ohmic value of the anticipator resistor 70 connected in series with the bimetallic element, it is only necessary to remove the cover 12 and manually rotate the slider 76. In addition, when the cover 12 is removed, the screw 94 can be adjusted to change the calibration and the screw 116 can be adjusted to vary the temperature differential of the bimetallic switch.

While the embodiment of the invention as herein disclosed constitutes a preferred form, it is to be understood that other forms might be adopted.

What is claimed is as follows:

1. In a thermostat, a circular base member, temperature responsive means carried by said base member, a fixed stub shaft carried by said base member, adjusting means for said temperature responsive means rotatably mounted on said stub shaft, a circular cover member interconnected with said adjusting means for positioning said adjusting means and having indicia of temperature thereon, and an index fixedly attached to said stub shaft and cooperating with said indicia of temperature to indicate the control point of said temperature responsive means.

2. In a thermostat, a circular base member, temperature responsive means carried by said base member, a fixed stub shaft carried by said base member and extending outwardly therefrom, adjusting means for said temperature responsive means rotatably supported on said stub shaft, a scale plate attached to said stub shaft at the outer end thereof having indicia of temperature thereon, a bimetal thermometer carried by said stub shaft and cooperating with the indicia of temperature on said scale plate, a circular cover member interconnected with said adjusting means for positioning said adjusting means and having indicia of temperature thereon, and an index on said scale plate cooperating with the indicia of temperature on said cover member to indicate the control point of said temperature responsive means, said circular cover member having a transparent portion overlying said scale plate through which the indicia of temperature and the index on said scale plate are visible.

3. In a thermostat, a circular base member, temperature responsive means pivotally attached to said base member, a fixed stub shaft attached to said base member and extending outwardly therefrom, a cam rotatably journalled on said stub shaft, spring biased cam follower means carried by said temperature responsive means and engaging said cam, whereby rotation of said cam relative to said base adjusts said temperature responsive means to vary the control point thereof, a circular cover member interconnected with said cam for adjusting the position thereof and having indicia of temperature thereon, and an element fixedly attached to said stub shaft and having an index cooperating with the indicia of temperature on said cover member to indicate the control point of said temperature responsive means.

4. The thermostat set forth in claim 3 wherein said circular base member has a cylindrical recess, a circular sub-base disposed within said cylindrical recess, and means interconnecting said base member and said sub-base member.

5. The thermostat set forth in claim 3 wherein said temperature responsive means comprises a bimetal element, and wherein said thermostat includes a wire wound anticipator resistor disposed proximate said bimetal element and attached to said base member, said anticipator resistor being electrically connected in series with said bimetal element, and an adjustable slider rotatably mounted on said base and engageable with said anticipator resistor.

6. The thermostat set forth in claim 3 wherein said element having said index comprises a scale plate having an indicia of temperature thereon, and wherein said thermostat includes a spiral bimetal thermometer carried by said stub shaft and having a pointer cooperating with the indicia of temperature on said scale plate to indicate ambient temperature.

References Cited in the file of this patent
UNITED STATES PATENTS

| | | |
|---|---|---|
| 2,394,920 | Kronmiller | Feb. 12, 1946 |
| 2,702,844 | Kronmiller | Feb. 22, 1955 |
| 2,729,719 | Kronmiller | Jan. 3, 1956 |
| 2,786,924 | Kronmiller | Mar. 26, 1957 |
| 2,847,539 | Pounds et al. | Aug. 12, 1958 |
| 2,855,484 | Kreuter | Oct. 7, 1958 |